Patented Oct. 24, 1922.

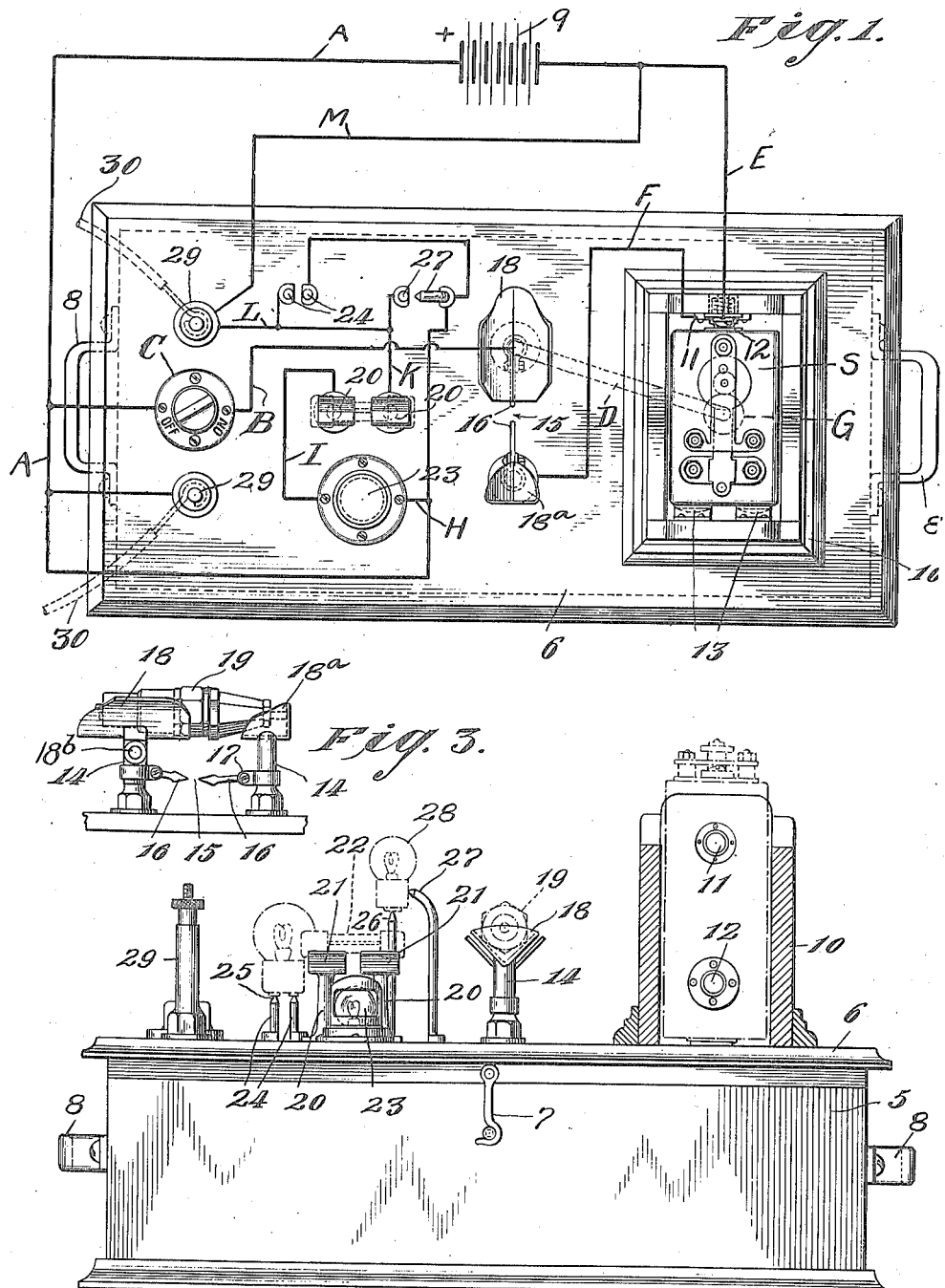

1,433,488

UNITED STATES PATENT OFFICE.

GEORGE EDWARD SMITH, OF NEW YORK, N. Y.

TESTING DEVICE.

Application filed May 9, 1919. Serial No. 295,929.

*To all whom it may concern:*

Be it known that I, GEORGE EDWARD SMITH, a citizen of the United States, and a resident of the city of New York, borough of Manhattan, in the county and State of New York, have invented a new and Improved Testing Device, of which the following is a full, clear, and exact description.

The present invention relates to new and useful improvements in testing machines, and pertains more particularly to a device of this character for ascertaining the condition of various electrical appliances.

The invention has for its primary object to provide a self-contained portable device particularly adapted for testing motor vehicle accessories, such, for example, as vibrator coils, spark plugs, fuses, socket lamps, bells, horns, and the like.

Reference is to be had to the accompanying drawings forming part of this specification in which similar characters of reference indicate corresponding parts in all the figures, and in which—

Figure 1 is a top plan view of the device showing the wiring diagram;

Fig. 2 is a side elevation;

Fig. 3 is a detail view of the spark plug testing device, showing the rockable terminal which can be shifted to accommodate different sizes of plugs.

Referring more particularly to the drawings, the reference character 5 designates a box-like receptacle, and 6 designates a hinged cover therefor, the said hinged cover being maintained in closed position by a hook or other securing means 7. Handles 8 are provided by which the device may be moved from place to place, thus rendering the same readily portable.

The box-like structure 5 is adapted to contain a suitable battery designated in Fig. 1, by the reference character 9, and the several connecting wires leading from the various testing elements are adapted to be secured to the under side of the hinged cover 6 in any well-known manner.

The reference character 10 designates a second box-like structure, the upper end of which is open, and said box-like structure is secured to the outer face of the cover 6 in any desired manner. This box-like structure 10 is provided in one of its end walls with low and high tension spring contacts 11 and 12 respectively. These contacts 11 and 12 are positioned with respect to each other in such a manner that when a vibrator coil is inserted within the box-like structure 10, the corresponding contacts on the side of said coil will coincide with the elements 11 and 12 heretofore mentioned. Secured to the opposite end of the box-like structure 10 on its inner face are two springs 13, which serve to maintain the contacts of the vibrator coil in engagement with the contact elements 11 and 12, as more clearly shown in Fig. 1.

The reference character 14 designates vertical standards carried by the hinged cover 6 at a point adjacent the box-like structure 10, and secured to said vertical standards, intermediate of their ends, is a spark gap 15, said spark gap being obtained by the spaced relation of the electrodes 16, which in turn are carried by the standards 14. These electrodes 16 are pivotally mounted by means of screws or the like 17, and by rocking them about their pivotal points, the spark gap may be increased or decreased as desired.

Secured to the upper ends of the standards 14, are trough-like terminals 18, 18ª, and as shown in Figure 3, these terminals are adapted to support a spark plug 19, for the purpose of testing the same. To this end, the terminal 18ª has a walled end to be abutted by the plug when in position, and the terminal 18 is rockable on the pivot 18ᵇ so that it may be shifted to accommodate different sizes of plugs. The spark plug 19 is positioned on the terminal troughs 18, 18ª so that its terminals are in contact therewith, and that a circuit being made to pass therethrough will jump the spark gap of the spark plug if the same is in perfect condition.

The reference character 20 designates two vertical standards, upon the upper end of each of which is mounted a sheet metal member 21, and said sheet metal members 21 are adapted for receiving a fuse 22, shown in dotted lines in Figs. 1 and 2, in such a manner that the metallic contact plates on each of its ends will engage with said members. Adjacent the two standards 20, is a light 23, the purpose of which will be hereinafter described.

Projecting vertically from the cover 6 are two standards 24, the upper end of each of which is reduced, as at 25, and these standards are adapted for use in testing incandescent lights of the double contact type, Adjacent the standards 24, are a similar pair of standards 26, one of which has a curved extension 27 which projects slightly above the standard 26 for the purpose of testing incandescent lights commonly known as the single contact type.

Carried by the hinged cover 6, near one end thereof, are two binding posts 29, and leading from said binding posts 29 are terminal wires 30. By means of these terminal wires 30, bells, horns, and other similar devices may be attached for the purpose of making tests thereof.

The circuit connections and mode of operation of the testing box should now be followed. The battery 9, described above, furnishes current for all tests which can be made with this instrument. It should be stated by way of preface, that the spark coil S is one of the induction coil units usually employed in connection with the ignition circuit of the "Ford" automobile.

This coil has three visible terminals, namely, the one which engages the ground connection G and the other two which engage the high and low tension terminals 11 and 12. If it be desired to test the induction coil S or to adjust the vibrator, the coil is inserted in the box 10 so that the various contacts engage; the electrodes 16 are either moved into contact with each other or spaced apart, as may be desired. The operator now closes the switch C, whereupon current flows from the positive pole of the battery 9 over wire A to switch C, wire B to the low tension terminal post 18, wire D to the ground connection G, through the primary winding of the coil S to terminal 12 and back to battery via wire E.

If the electrodes 16 are drawn apart a spark is seen to leap across the gap, and when the electrodes are moved into contact so as to complete the metallic path, the vibrator of the coil can be adjusted as may be desired, according to the sound of the "buzz". The path of the high tension circuit is: current induced in the secondary winding of the coil emerges at the high tension contact 11, traverses wire F reaching the terminal trough 18$^a$, across electrodes 16 to the low tension terminal 18, then back to the secondary winding.

In testing a spark plug the coil S must be left in position in the box 10. Any size plug may be fixed between the terminal troughs 18, 18$^a$, the trough 18 being capable of adjustment so that large and small plug bases may be accommodated equally as well. Assume a plug to be positioned as designated in Figure 2. The operator closes the switch C whereupon current flows from the positive pole of the battery 9 over wire A, through switch C, over wire B to the low tension terminal 18, over wire D to the ground connection G emerging at the low tension contact 12 and returning to the battery 9 via wire E. The high tension current emerges at contact 11 traverses wire F reaching high tension terminal 18$^a$, passing through the spark plug so that a spark is seen to leap between the electrodes of the plug, returning to the high tension winding.

It is only when a coil S or a spark plug 19 is to be tested that the switch C is made use of, all other testing places on the box requiring only the application of the accessory to be tested to complete the testing circuit for that particular accessory. This is not the case when testing a coil or a spark plug, because obviously it would be unsafe to leave the high tension circuit exposed in such a manner that the operator's fingers could easily come in contact therewith. In other words, in testing a spark coil or plug, either accessory is put in place, and when thus in place, the testing circuit must be closed by a second act on the part of the operator, namely, by pressing the switch C.

Assume now that it is desired to test any fuse. The fuse is laid across the supports 21 whereupon current flows from the positive pole of the battery 9 over the wires A and H to the lamp 23, over wire I to one support 21, flowing through the fuse to the other support 21, then over wires K and L to the binding post 29, and from thence over wire M to the negative pole of the battery. If the fuse is perfect, the lamp 23 will be lighted.

The reader can easily understand how other accessories, such as various kinds of lamps, may be tested at the points 24 and 27 by merely tracing out the circuit and assuming that such accessory is in position. Current from the battery 9 may be conducted to some devce which cannot be presented to the testing box for a test, by connecting ordinary lead wires to the binding posts 29, at such time current flowing from the positive pole of the battery 9 over wire A to the lower binding post 29, through one lead wire 30 to the external device to be tested, returning via the other wire 30 to the upper binding post 29 and then returning to the negative pole of the battery via wire M.

While the construction and arrangement of the improved testing box as herein described and claimed, is that of a generally preferred form, obviously modifications and changes can be made without departing from the spirit of the invention or the scope of the claims.

Having thus described the invention, what is claimed as new is:

1. Testing apparatus comprising a terminal trough with a walled end to be abutted by one end of a spark plug, a companion terminal trough into which the base of said spark plug is laid, means enabling rocking the companion trough to accommodate various sizes of plug bases, and means to furnish high tension current for testing the spark plug.

2. Testing apparatus comprising a terminal trough with a walled end to be abutted by one end of a spark plug, a companion terminal trough into which the base of said spark plug is laid, standards upon which said troughs are mounted, and a hinge connection between one standard and the second mentioned trough enabling rocking said trough to accommodate various sizes of spark plugs.

3. Testing apparatus comprising a pair of standards, a pair of electrodes, clamp bands by which the electrodes are mounted upon the standards, and screws by which the bands are clamped upon the standards and the electrodes are mounted on the bands for pivotal adjustment.

GEORGE EDWARD SMITH.